United States Patent Office 3,027,384
Patented Mar. 27, 1962

3,027,384
PREPARATION OF 16α,17α-DIHYDROXY PROGESTERONE
Patrick A. Diassi, Westfield, N.J., assignor to Olin Mathieson Chemical Corporation, New York, N.Y., a corporation of Virginia
No Drawing. Filed Oct. 23, 1959, Ser. No. 848,205
1 Claim. (Cl. 260—397.4)

This application relates to the provision of a highly useful process for obtaining 16α,17α-dihydroxypregnen-20-ones (e.g., 16α,17α-dihydroxyprogesterone and 16α,17α-dihydroxypregnenolone) from the corresponding 16α-esters thereof.

The compound 16α,17α-dihydroxyprogesterone is a highly useful intermediate for the preparation of physiologically active steroids. Prior to this invention, however, there was no known commercially feasible method for obtaining 16α,17α-dihydroxypregnen-20-ones. Thus, it has been known that 16-dehydropregnen-20-ones can be treated with various oxygenating agents capable of substituting hydroxyl radicals on steroid nuclei. For example, Cooley et al., J. Chem. Soc., 1955, 4373–77, discloses the treatment of 16-dehydropregnenolones with potassium permanganate to obtain 16α,17α-dihydroxy derivatives. Unfortunately, however, this process results in low yields of the desired dihydroxy product, and high conversion to undesirable by-products. Another known method is disclosed by Cooley et al., J. Chem. Soc., 1955, 4377–83. This method comprises treating 16-dehydropregnenolones with osmium tetroxide, to yield an osmium complex which is hydrolyzed to the desired 16α,17α-dihydroxy derivative. Unfortunately, this process results in only low yields of the desired product, and by virtue of the extreme toxicity of the osmium complex as well as its expense, its use in a commercial installation is precluded.

It is an object of this invention to prepare 16α-17α-dihydroxypregnen-20-ones by a simple, direct and commercially feasible method, involving the use of easily obtainable and relatively inexpensive known starting materials.

This and other objects are accomplished in accordance with this invention by a process wherein 16α-acyloxy-17α-hydroxypregnen-20-ones are hydrolyzed under critically controlled conditions of alkalinity and temperature to the desired 16α,17α-dihydroxypregnen-20-one final products. The present discovery of the limited conditions under which the 16α-acyloxy-17α-hydroxy starting materials could be treated to yield the desired 16α,17α-dihydroxy steroids is indeed surprising since heretofore all attempts at the saponification of the 16α-acyloxy-17α-hydroxy-starting materials [see Cooley et al. supra, and Romo et al., J. Org. Chem., 21, 902–909 (1950)], have resulted not in saponification, but rather in the preparation of undesired D-homo compounds of the type depicted by the following formula:

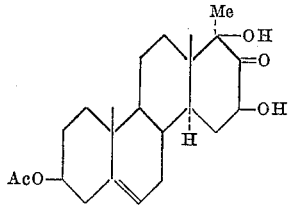

In order to proceed by the method of this invention, a solution or suspension of the starting 16α-acyloxy-17α-hydroxypregnen-20-one, e.g., 16α-acyloxy-17α-hydroxyprogesterone and 3β-hydroxy(or acyloxy)-16α-acyloxy-17α-hydroxy-Δ⁵-pregnene-20-one, wherein the acyl radical is the acyl radical of a hydrocarbon carboxylic acid of less than ten carbon atoms such as a lower alkanoic acid (e.g., acetic, propionic and hexanoic acid), an aromatic acid (benzoic and o-, m- and p-toluic acid) and aralkanoic and aralkenoic acids (e.g., phenylacetic and cinnamic acid) in an inert organic solvent is treated with a weak base at a temperature which is less than the reflux temperature of the solvent and preferably close to ambient temperature. The steroid solution or suspension is prepared by dissolving or suspending the steroid in an inert conventional organic solvent for steroids, such as acetone, methanol or dimethylformamide. Weakly alkaline conditions are obtained by contacting the dissolved steroid, with a basic material, such as dilute alkali (e.g., dilute sodium hydroxide) and preferably a salt of a strong base and weak acid (e.g., potassium carbonate and potassium acetate). The proper amount of basic material to be added is dependent upon the particular base used, as well as the prevailing temperature during treatment. The reaction mixture is permitted to stand, or is heated at a slightly elevated temperature for a period of time necessary to effect the desired conversion to the 16α,17α-dihydroxy steroid product. Conversion time varies between a period of about one hour and overnight, with most conversions being readily effected in less than three hours.

After conversion, the reaction mixture is neutralized and the desired product is extracted from the reaction mixture by conventional procedures for extracting steroids. If the product obtained is 16α,17α-dihydroxypregnenolone, viz: when the starting material is 16α-acyloxy-17α-hydroxy-pregnenolone, it may be oxidized by the conventional Oppenauer method (e.g., with aluminum isopropoxide in toluene) to the 16α,17α-dihydroxy-progesterone.

The following examples are presented in illustration, but not limitation of the invention:

EXAMPLE 1

Preparation of 16α,17α-Dihydroxyprogesterone

To a solution of 446 mg. (1.15 mmol.) of 16α-acetoxy-17α-hydroxyprogesterone [prepared by the method of Romo and De Vivar, J. Org. Chem. 21, 902 (1956)] in 20 ml. of methanol, is added 2.0 ml. of 10% potassium carbonate. The solution is flushed with nitrogen and left at room temperature for 1 hour during which time some of the 16α,17α-dihydroxyprogesterone crystallizes. The mixture is neutralized with 10% acetic acid, diluted with water and extracted with ethyl acetate. The ethyl acetate extract is washed with water, dried over sodium sulfate and evaporated to dryness. The residue (377 mg.) on crystallization from 95% ethanol gives 324 mg. of 16α,17α-dihydroxyprogesterone, M.P. 208–210°; [α]$_D$+98.2° (chlf.);

$$U.V. \lambda_{max}^{alc.} \ 240 \ m\mu \ (\epsilon = 15{,}300)$$

In a similar manner, other 16α-acyloxy-17α-hydroxyprogesterones such as 16α-benzoyloxy and 16α-phenacetoxy-17α-hydroxyprogesterone can be hydrolyzed to yield 16α,17α-dihydroxy-progesterone.

EXAMPLE 2

Preparation of 16α,17α-Dihydroxypregnenolone

To a suspension of 288 mg. 3β,16α,17α-trihydroxy-Δ⁵-pregnene-20-one 3,16-diacetate (prepared by the method of Romo & De Vivar, loc. cit.) in 15 ml. methanol, 1.43 ml. of 10% potassium carbonate is added and the mixture stirred at room temperature for 2 hours during which time the steroid dissolves and the 16α,17α-dihydroxypregnenolone crystallizes. The mixture is neutralized with 10% acetic acid and the 16α,17α-dihydroxypregnenolone filtered, washed with methanol and dried. Yield: 115 mg.

The filtrate on dilution with water and extraction by chloroform followed by evaporation of the solvent and crystallization of the residue from acetone gives an additional 71 mg. of 16α,17α-dihydroxypregnenolone.

In a similar manner, other 16α-acyloxy-pregnenolones such as 16α-phenacetoxy-17α-hydroxypregnenolone and 16α-benzoyloxy-17α-hydroxypregnenolone can be treated to yield 16α,17α-dihydroxypregnenolone.

The invention may be variously otherwise embodied within the scope of the appended claim.

What is claimed is:

The process for the preparation of 16α,17α-dihydroxyprogesterone which comprises treating a solution of 16α-acyloxy-17α-hydroxy progesterone wherein the acyloxy radical is of a hydrocarbon carboxylic acid of less than ten carbon atoms, at ambient temperature with a dilute solution of potassium carbonate and separating the product thus formed.

References Cited in the file of this patent

UNITED STATES PATENTS

| | | |
|---|---|---|
| 2,727,907 | Chinn et al. | Dec. 20, 1955 |
| 2,773,058 | Bernstein et al. | Dec. 4, 1956 |
| 2,864,838 | Lincoln et al. | Dec. 16, 1958 |
| 2,865,808 | Agnello et al. | Dec. 23, 1958 |
| 2,894,961 | Dodson | July 14, 1959 |